(12) United States Patent
Sun et al.

(10) Patent No.: US 8,290,519 B2
(45) Date of Patent: *Oct. 16, 2012

(54) MOBILE NETWORK PRESENCE SERVICE WITH LOAD-BASED NOTIFICATION THROTTLING

(75) Inventors: Yaojun Sun, South Riding, VA (US); Jing Qu, Reston, VA (US); Joseph Schaedler, Reston, VA (US); Wei-Ming Lan, Morrisville, NC (US); Douglas R. Green, Lexna, KS (US)

(73) Assignee: Spring Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,486

(22) Filed: Sep. 22, 2011

(65) Prior Publication Data

US 2012/0071178 A1 Mar. 22, 2012

Related U.S. Application Data

(63) Continuation of application No. 11/935,983, filed on Nov. 6, 2007, now Pat. No. 8,060,121.

(51) Int. Cl.
*H04W 68/00* (2009.01)
(52) U.S. Cl. ............ 455/458; 455/414.1; 455/450; 455/452.1; 455/452.2; 455/453; 455/515; 370/310.2; 370/312; 370/328

(58) Field of Classification Search ............ 455/414.1, 455/450, 452.1, 453, 458, 515, 452.2; 370/310.2, 370/312, 328
See application file for complete search history.

(56) References Cited

U.S. PATENT DOCUMENTS

| | | | | |
|---|---|---|---|---|
| 5,423,062 A | * | 6/1995 | Sakakura | 455/515 |
| 2006/0286993 A1 | * | 12/2006 | Xie et al. | 455/518 |
| 2007/0182541 A1 | * | 8/2007 | Harris et al. | 340/506 |

* cited by examiner

*Primary Examiner* — Steve D Agosta

(57) ABSTRACT

Methods and systems are described for providing a presence service that is useful for mobile telecommunications devices. A plurality of outgoing presence updates are sent to a presence client. The system monitors the level of network traffic and determines whether the client is in a region of high network load, and if so, the system throttles the outgoing presence updates during the condition of high network load. The level of throttling may depend at least in part on the amount of time that has elapsed since the presence client began a presence session, and/or the amount of time that has elapsed since an incoming presence update was received from the presence client. In determining the latter amount of elapsed time, the system may consider only the amount of time elapsed since an incoming non-automatic presence update was received from the presence client.

17 Claims, 5 Drawing Sheets

MOBILE NETWORK PRESENCE SERVICE WITH LOAD-BASED NOTIFICATION THROTTLING

CROSS-REFERENCE TO RELATED APPLICATION

The present application is a continuation of U.S. patent application Ser. No. 11/935,983, filed on Nov. 6, 2007, the entire contents of which are herein incorporated by reference.

BACKGROUND

The present disclosure relates to networked communications, and particularly to a presence service adapted for use with mobile devices.

Many individuals can now be contacted through several of a variety of services, such as a land-line telephone connection, a mobile telephone connection, a push-to-talk (PTT) voice connection, one or more instant messaging accounts, and one or more electronic mail accounts. Given these choices, it can be difficult to determine how an individual can best be contacted at a given time, if he can even be contacted at all. To address this issue, various "presence" services have become available. Presence services allow an individual and/or the devices he uses for communications to share information on the state of the individual and/or those devices. The entity providing presence information is commonly referred to as a "presentity." Those entities that learn about the presence state of a presentity are commonly referred to as "watchers." Watchers wishing to contact the individual can, if they are authorized, learn the presence state of the presentity to determine how, if at all, the presentity should be contacted.

Certain existing or proposed presence systems are outlined in various "Internet Request for Comments" (RFC) documents. Such RFCs include RFC 2778, "A Model for Presence and Instant Messaging"; RFC 2779, "Instant Messaging/Presence Protocol Requirements"; RFC 3856, "A Presence Event Package for the Session Initiation Protocol (SIP)"; RFC 3863, "Presence Information Data Format (PIDF)"; RFC 3921, "Extensible Messaging and Presence Protocol (XMPP): Instant Messaging and Presence"; and RFC 3859, "Common Profile for Presence (CPP)."

Other existing or proposed presence systems have been outlined in specifications prepared by the Open Mobile Alliance.

One challenge faced by presence systems is to balance two competing needs. On the one hand, it is desirable for presence information to be kept as up-to-date as possible. On the other hand, particularly where wireless mobile stations are involved, the amount of messaging needed to share up-to-date presence information can put noticeable strains on bandwidth, computational resources, and battery power. This challenge has been addressed in various ways. As one example, J. Brock, in "Regulating Publication of Event State Information" (Mar. 6, 2006), proposes various solutions to the problem that "[o]n a mobile device, monitoring resources in order to publish changes of the presence state can be costly in terms of battery and computing resources. Even worse, publishing information regularly over a cellular network can have a dramatic effect on the battery lifetime, number of messages and transmitted data volume." Taking another approach, T. Moran et al., in "Requirements for Presence Specific Event Notification Filtering" (Jan. 26, 2004), propose a filtering mechanism to reduce the number of presence-related messages received by a wireless device.

As recognized in U.S. Patent Application Publication No. 2006/0286993, incorporated herein by reference, the number of presence-related messages sent to a watcher can be reduced by assigning different priorities to different types of presence events, and by assigning a maximum and/or minimum delay for such events.

SUMMARY

Methods and systems are described for providing a presence service that is particularly useful for mobile telecommunications devices.

In a presence system, a plurality of outgoing presence updates are sent to a presence client. The system monitors the level of network traffic and determines whether the client is in a region of high network load. If the client is in a region experiencing a condition of high network load, the system throttles the outgoing presence updates during the condition of high network load.

In one embodiment, the system determines whether the client is in a region experiencing a period of high network load by determining a paging channel load of a paging channel serving the client. If the paging channel load is above a threshold, then the client is considered to be in a region experiencing a condition of high network load.

The system may apply different levels of throttling for different clients. In one embodiment, the level of throttling depends at least in part on the amount of time that has elapsed since the presence client began a presence session, and/or the amount of time that has elapsed since an incoming presence update was received from the presence client. In determining the latter amount of elapsed time, the system may consider only the amount of time elapsed since an incoming non-automatic presence update was received from the presence client.

In an exemplary embodiment, the system uses minimum-delay throttling, wherein presence updates are scheduled such that at least a minimum delay period elapses between consecutive updates to a particular client. Where different levels of throttling are used, the length of the minimum delay may depend at least in part on the level of throttling. The length of the minimum delay may also depend at least in part on the level of network load.

DETAILED DESCRIPTION

I. Overview of an Exemplary Embodiment

A. Network Architecture

Figure 1:
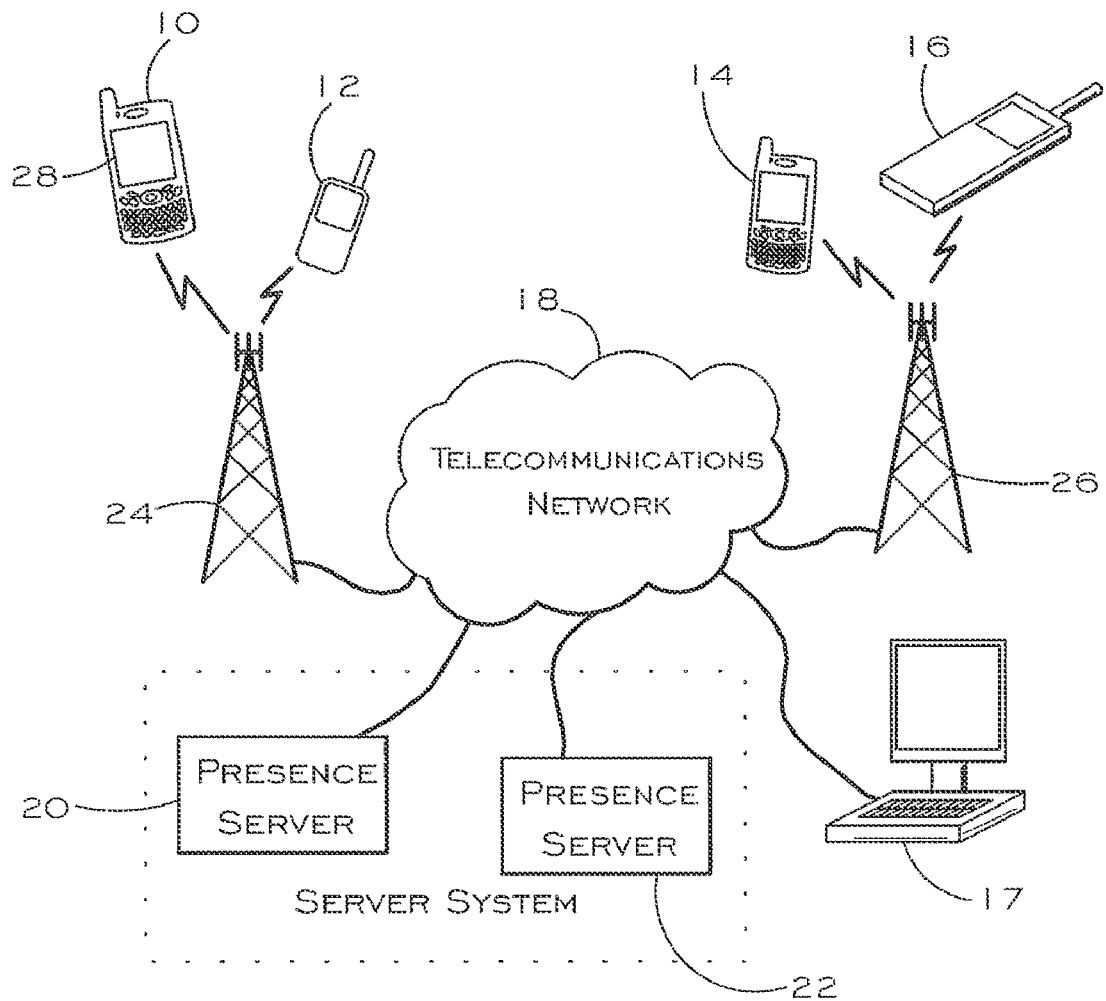
FIG. 1 is a schematic diagram of the network architecture of a presence service for mobile stations.

A presence system as described in this example, and in accompanying FIG. 1, provides a presence service to mobile stations 10, 12, 14 and 16, and, in some embodiments, one or more fixed endpoints 17. The design of this presence system is intended to detect situations of high network load and, when such high-load conditions exist, to reduce the frequency with which presence updates are sent to each mobile station. Preferably, this reduction in the number of presence updates is accomplished by introducing a minimum delay between consecutive updates sent to a particular mobile station, a technique referred to herein as minimum-delay throttling. The length of this minimum delay may be different for different mobile stations. In particular, the system may use objective parameters to gauge the likely level of interest of a mobile station's user in presence updates, and use a shorter minimum delay for users who are more likely to be interested in presence updates.

Such a system includes a plurality of mobile devices capable of communicating over a network 18. One or more servers 20, 22 in a presence server system are capable of communicating with the mobile devices over the network. The mobile devices may communicate over the network through base transceiver stations 24, 26 of a wireless telecommunications network. In this example, each of the mobile devices is capable of sending presence information to the presence server, and each of the mobile devices is further capable of receiving, from the presence server, presence information relating to one or more of the other mobile devices. Each mobile device may not be interested in the presence state of all other mobile devices, and in that case it may subscribe only to receive information on the presence states of those devices in which it is interested.

B. Mobile Device States

Each of the mobile devices includes a user interface, such as a display 28 and a keypad 30. Each of the mobile devices further includes presence access logic. The presence access logic enables the presentation on the display of other mobile devices' presence information. The presence access logic may be, for example a contact list software application or an instant messaging client application.

A mobile device has a plurality of presence states. Preferably, each communication service offered by the mobile device is associated with at least one presence state. For example, a mobile device capable of communicating with voice calls, PTT-sessions, or data sessions (e.g., instant messaging) has respective states of "in-call," "in-PTT," and "in-data." The mobile device is in the in-call state during a voice call, the in-PTT state during a PTT session, and the "in-data" state during a data session. Mobile devices with additional bearer communication services may have additional states corresponding to such services.

A mobile device in this embodiment may also have a "display" presence state and an "idle" presence state. A mobile device enters the "display" state when a user takes steps to activate the presence access logic. These steps may vary in different embodiments and on different devices, but such steps can include turning on the display of the mobile station, opening a "flip phone" or clamshell-type mobile telephone to view the display, or selecting the presence access logic from a menu of options. The mobile device leaves the display state when the user has stopped using the presence access logic. Determining when the user has stopped using the presence access logic can be done in different ways. For example, the mobile device can exit the display state when the device enters an in-call, in-data, or in-PTT state. In another example, the mobile device can exit the display state when the display of the mobile device is turned off (either manually or automatically), or the mobile device itself is powered down. In another example, the mobile device can exit the display state after the user has exited the presence access logic, or after a predetermined amount of time has passed since the last manual input on the mobile device.

A mobile device is in the idle state when it is accessible for communications with the network (e.g., it is not powered down or out of range), but it is not in the display state, or in an in-call, in-data, or in-PTT state.

C. Detecting Conditions of High Network Load

In a preferred embodiment, minimum-delay throttling is used only during conditions of high network load. With the understanding that levels of network load can be geographically variable, conditions of network load can be measured on a sector-by-sector, cell-by-cell, or other basis. In a preferred embodiment, the system determines whether there is a high network load in a sector, cell, or other region by reference to the level of traffic on a paging channel associated with such a region. For example, if there is only a small amount of paging channel traffic in a cell, mobile stations in that cell can receive presence updates without any minimum-delay throttling. On the other hand, if paging channel traffic in that cell exceeds a particular threshold, then minimum-delay throttling can be implemented for the mobile stations in that cell, reducing the number of presence update messages sent to those mobile stations. Thus, the level of paging channel traffic can be used as a measure the network load even though presence updates are not themselves sent over the paging channel. Minimum-delay throttling can be ceased when the paging channel traffic falls below a threshold (which may be lower than the threshold identified earlier in this paragraph).

D. Watcher-Dependent Level of Minimum-Delay Throttling

In a preferred embodiment, the level of throttling varies depending on objective parameters that are suggestive of a user's level of interest in presence information. In an embodiment that uses minimum-delay throttling, the length of the minimum delay can vary from mobile station to mobile station. The more likely a user is to be interested in the presence information, the shorter the length of the minimum delay.

One parameter that can be used in determining the amount of the minimum delay is the length of time that has passed since a presence session was initiated on the mobile station. It is likely that the average user has a greater level of interest in presence information when he first initiates a presence session. As the session continues, the level of interest is likely to decrease. Thus, in a preferred embodiment, with other factors being equal, greater throttling takes place for users whose presence sessions have been active for a longer period of time. The relevant presence session for this metric need not be an "active presence session" as described below. Rather, a presence session may begin when a watcher application begins running on the mobile station, regardless of whether presence information is actually being displayed on the watcher application. Because the initiation of a presence session typically includes the watcher application sending a registration message to a presence server, the presence server can record the time of such a registration message to determine the start of a presence session. A watcher application need not be a dedicated presence application; it may be, for example, a contact list application that displays presence information of the listed contacts. A presence session can come to an end when a watcher application sends a de-registration message to the presence server, for example as a result of shutting down the watcher application or turning off the mobile station on which it runs.

Another parameter that can be used in determining the amount of the minimum delay is the amount of time that has passed since the watcher itself has sent a presence update. A user who is himself sending frequent presence updates is likely to be more interested in the presence information of others. This is especially the case where the presence updates sent by the watcher are updates that result from user choice. For example, a user who makes non-automatic changes to presence states, such as changes between "busy" and "not busy," has demonstrated an active interest in presence services. Passive presence updates, such as those sent automatically when a user initiates or terminates a telephone or PTT call, may reveal less about the user's level of interest in presence information and may have less of a bearing on the frequency of updates sent to the user. Thus, with other factors being equal, a watcher who makes frequent non-automatic changes to presence states will, in a preferred embodiment, be assigned a shorter minimum delay if throttling is implemented.

Another parameter that can be used in determining the amount of the minimum delay is whether the watcher is in an active presence session and/or is in a display state. Users whose mobile devices that are in an active presence session and/or are in a display state are more likely to be interested in receiving frequent presence updates than similarly situated users whose mobile devices are not in such states. A mobile device in this example is considered to be in an active presence session with the presence server if either (1) it is in the display state and has requested the presence information of at least one other mobile station; or (2) at least one other mobile station is in the display state and has requested the presence information of the first mobile station. As described in further detail below, the display state is intended to correspond with times during which the presence information is reasonably likely to be accessed by a human user. As a result, an active presence session of a first mobile station generally corresponds to a time when either the first mobile device's user is likely to be accessing the presence information of a second mobile device, or the user of a second mobile device is likely to be accessing the presence information of the first mobile device.

Whether a mobile device is in an active presence session is determined in part by the states of other mobile devices. As a result, at least some presence information is exchanged outside the context of an active presence session to determine whether it is necessary to enter an active presence session. For example, even if a first mobile device is not in an active presence session, the presence server nevertheless reports to the first mobile device when a second mobile device enters a display state and is requesting presence information on the first mobile device. This lets the first mobile device know that it should enter an active presence session. Moreover, each mobile device preferably reports to the presence server each time it transitions to the display state, even if it is not in an active session. This lets the presence server know whether it needs to prompt any other mobile devices to enter an active presence session.

Other factors that are not necessarily indicative of a user's interest in presence information may also be considered in determining the level to which presence updates are throttled. As one example, the minimum delay period can be increased as the network load increases. In a preferred embodiment, the network load is measured by reference to the load in the paging channel. Thus, with other factors being equal, a mobile station in a region with a higher paging channel load will experience greater throttling, and the minimum delay period for presence updates being sent to that mobile station will be greater. Although, as noted above, mobile stations in regions with below-threshold paging channel loads may not be subject to minimum-delay throttling at all, even where the paging channel loads differ somewhat among various regions that are also below the threshold.

For simplicity, the foregoing example was described as one in which each mobile station was similarly equipped. In alternative embodiments, different mobile stations may have more, less, or different communications services or presence states. Some mobile devices may be capable of acting only as watchers while other mobile devices may be capable of acting only as presentities. Embodiments may include a single presence server, or a plurality of presence servers. In a preferred embodiment, each presence server is associated with a different home network or communications service provider, and each such network or service provider may operate more than one presence server. Some embodiments may include endpoints other than mobile devices, such as personal computers.

II. Processing Presence Information

An exemplary presence client is, in a preferred embodiment, implemented in a mobile station, such as a data-enabled mobile telephone. Such a client is preferably provided with the capability of acting as both a presentity and a watcher, though one of those capabilities may be disabled or may not be present. An exemplary presence server is preferably implemented as a network server and may be a node on the Internet. Presence clients and a presence server may communicate through, for example, a packet data serving node (PDSN) of a telecommunications service provider. The following sections describe the interaction of presence clients and presence servers to process and exchange presence information.

A. Presence States

For the purposes described herein, the condition of a presence client is described by which of various presence states it occupies, and by whether it is in an active session with the presence server. The different presence states which can be occupied by a client can differ in different embodiments, and in some embodiments, the states may be non-exclusive. An array of possible states is illustrated in Table 1.

TABLE 1

| STATE | DESCRIPTION |
| --- | --- |
| Power-Off | The client device is turned off. |
| Out-of-Network | The client device is out of network. |
| Idle | The client device is on, but not in use. |
| In-Call | The client device is being used for a voice call. |
| In-PTT | The client device is in a push-to-talk session. |
| In-Data | The client device is in a data session. |
| Change | The client device is in transition between states. |

If there are any watchers of a presentity, these watchers receive updates of the presentity's state from time to time. In general, the state information received by the watchers need not be as detailed as the information available to the presentity itself. For example, regardless of whether a presentity is in the "Power-Off", "Out-of-Network", "In-Call", "In-PTT", or "In-Data" state, a watcher may simply receive information that the presentity is "Unavailable." The level of detail of presence information sent to watchers may be an option that is configurable by the presentity, and the configuration may be different for different watchers. For example, a users's spouse may be informed that he is "Out-of-Network," but his business associates may be informed only that he is "Unavailable."

In general, a presentity client moves among different presence states as a result of activities at the client device. For example, making or receiving a phone call, sending or receiving data, turning the device on or off, selecting or deselecting a "do not disturb" feature, and accessing a user interface are all activities that, depending on the particular embodiment, can change the presence state of the presence client.

In addition to the presence states described above, a state referred to herein as the "display" state may be occupied by a presentity client. The "display" state is a state in which a human user of the client device is either attempting to access or is reasonably likely to attempt to access presence information of other presentities. Whether the user is reasonably likely to attempt to access presence information of other presentities can depend on the ways in which presence information is accessed by human users in a particular embodiment. For example, some embodiments may display other parties' presence information any time the display of a mobile device is turned on. In such an embodiment, the user is reasonably likely to access the presence information any time the device is turned on. In other embodiments, the presence information may be integrated with an electronic phone book or contacts list application; in that case the user is reasonably likely to access the presence information when the phone book or contacts list application is opened.

Thus, in various embodiments, the entry into the display state may take place in response to various occurrences. Conversely, exiting the display state may take place in response to various occurrences, such as closing out of an electronic phone book application, turning off of the presence client's display, or the passage of a preset amount of time with no user input. In different embodiments, the display state may also be exited when, for example, the mobile device transitions to an In-Call, In-Data, or In-PTT state.

In determining how the display state is to be entered or exited, the design of particular embodiments preferably takes into consideration that, in general, the longer a client is in the display state, the more presence messages will be exchanged with a server. As a result, in embodiments in which power or bandwidth are at a particular premium, the display state is preferably relatively short. Conversely, longer display states generally lead to less delay in receiving up-to-date presence information, so such longer states may be preferable in embodiments with fewer constraints on power and bandwidth.

B. Subscriptions

A client that is a watcher of another presentity may have a subscription to receive presence information as to that presentity. The term "subscription" should be understood here to refer to a choice to receive presence information, where that choice is capable of spanning more than one active session. A subscription may or may not last indefinitely, but a subscription to a presentity entails that it is not necessary for a human user to renew a request for information on that presentity each time he enters an active session. Subscription information may be stored by the presence server, or by the presence client. When subscription information is stored by the presence client, it should be noted that the presence client may need to renew a request for information on that presentity, even if its human user does not. One particularly useful application of subscriptions is for a presence client to have a subscription to receive presence information as to each presentity in his contact list, to the extent such information is available.

C. Active Sessions

In an optional embodiment, the presence system tracks whether a presence client is in an active presence session. In such an embodiment, it is preferred that exchanges of information take place predominantly when the presence client is in an active session with the presence server. When a presence client is in an active session, it preferably reports changes in its presence state to the presence server as they occur. Similarly, if the presence client is a watcher, the presence server preferably relays to the watcher reports of other presentities' state changes as they occur. Of course, some delay in reporting state changes is inherent in a messaging system. In general, though, a client that is in an active session with a presence server is receiving the most up-to-date presence information reasonably available about any presentities it is watching. Conversely, a presence server that is in an active session with a client is generally receiving the most up-to-date presence information reasonably available from that client. Outside of an active session, though, neither the client nor the server can assume that the last-received presence information is still accurate. Updating that state information can be done by re-entering an active session.

Whether or not a presence client is in an active session with the presence server can depend in part on activities at the client and in part on activities elsewhere. For example, whether the presence client is in an active session can depend in part on whether the client itself is in the display state. Whether it is in an active session can also depend in part on whether any watchers of the presence client are themselves in the display state. Watchers of the presence client are entities that either have a subscription to receive the client's presence information or that have issued requests to receive the client's presence information. Watchers that are in the display state are referred to as active watchers.

A presence client may be considered to be in an active session with the presence server when either of two conditions is true: if the client is in a display state and is a watcher of another presentity; or if the client has a watcher that itself is in a display state (an active watcher). In embodiments of a client that is only a presentity, not a watcher, the client is preferably in an active presence session only if it has an active watcher. In embodiments of a client that is only a watcher, not a presentity, the client is preferably in an active presence session only if it is in a presence state and is a watcher of another presentity.

Figure 2:
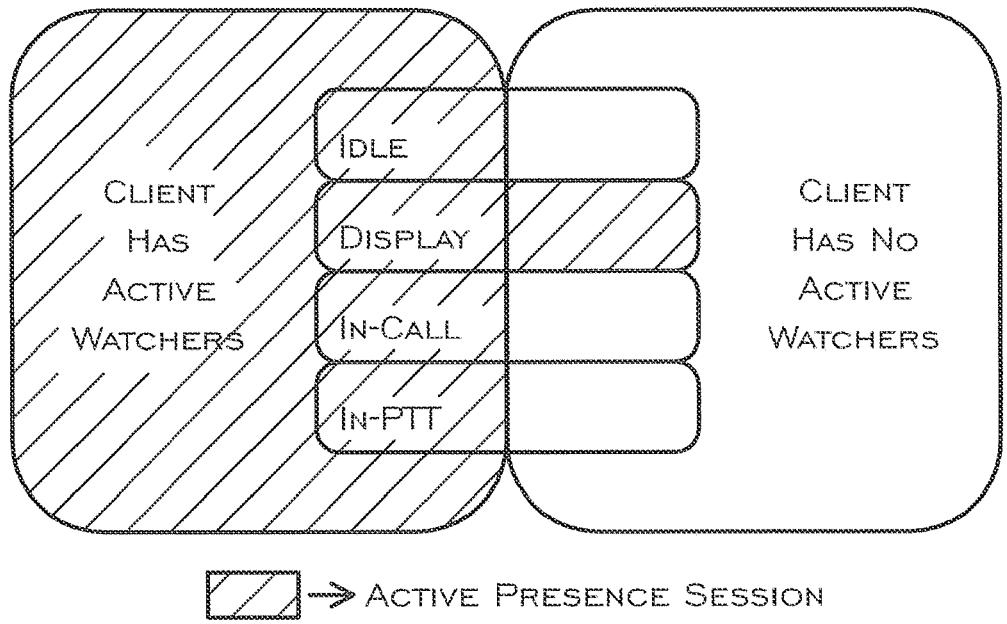
FIG. 2 is a Venn diagram schematically illustrating states occupied by client device in a presence service for mobile stations.

In various embodiments, the presence state may overlap with other presence states, or it may be exclusive of other presence states. FIG. 2 is a Venn diagram illustrating example presence states "Idle," "Display," "In-Call" and "In-PTT" as exclusive states. In different embodiments, there may be overlap between these states. The Venn diagram further illustrates that, in any of these presence states, the client may or may not have an active watcher. When the client does have an active watcher, the client is in an active presence session. When the client does not have an active watcher, the client is in an active presence session only if the client is in the display state.

D. Information Exchange Outside of Active Sessions

There are various instances in which a presence client and server exchange information outside of an active session. Where the sending of presence updates is dependent at least in part on whether a client is in an active session, this information helps the presence client and presence server determine whether an active session should be initiated.

Presence information may be exchanged between client and server when, for example, a presence client enters the display state. If the client reports that it has entered the display state, a determination can made as to whether that client is the watcher of any other presentities. If so, the client enters an active session. If a watched presentity is in an active session, the server already has up-to-data presence information for the presentity, and the server reports that information to the client. Otherwise, the server prompts the watched presentities to enter active sessions themselves, and subsequently the server conveys reports on the states of those presentities. A client that knows it is not an active watcher of any presentity need not report its entry into the display state to the presence server.

Conversely, the server preferably reports to the client when a watcher of the client enters the display state. When this occurs, the client can enter an active session and begin reporting state changes for the benefit of the watcher.

To prevent fruitless attempts at initiating active sessions with an out-of contact client, the client preferably reports to the server when it is turned off (or otherwise loses contact with the network), and when it is turned on again (or when it otherwise regains contact with the network). When the client is turned on, the determination can be made as to whether it has active watchers and, if so, the client can be prompted to enter an active session.

Although these and other types of communications may take place between client and server outside of an active session, more detailed state information is reported by a client in an active session than a client that is not in an active session.

As one example, outside of an active session, the client may report only when it is turned on or off, or when it enters the display state. In an active session, though, the client may report all of these state changes, plus a report for when it exits the display state, when it transitions from Idle to In-Call, from Idle to In-Data, or any other of a number of transitions.

E. State Information Messaging

In preferred embodiments, information on changes in presence states is exchanged using a messaging protocol. Implementation of the systems described herein is not strictly dependent on the particular syntax or other technical features of the messaging protocol chosen. Likewise, the systems described herein are not limited by the manner in which the semantic content of a message is conveyed, e.g., whether different message types mean different things or whether the same message type conveys different meanings depending on flag settings or other binary or character-based content within the message. Furthermore, it is to be understood that a messaging protocol as used herein preferably includes "OK" messages or analogous messages that confirm receipt of some other message. For simplicity, the exchange and processing of confirmatory and error messages is not illustrated herein.

Although various software or hardware-implemented logical structures can be used to process exchanged messaging information, particularly in different operating system environments, an exemplary embodiment that uses software driven by message-based dispatching is described herein for the sake of clarity. The software described herein is illustrated by "pseudo-code" whose structure and syntax can be adapted by practitioners of ordinary skill in network programming to be implemented in any of various computer programming languages for compilation into object code or other executable code.

1. Message Handling by a Presence Client

Figure 3:
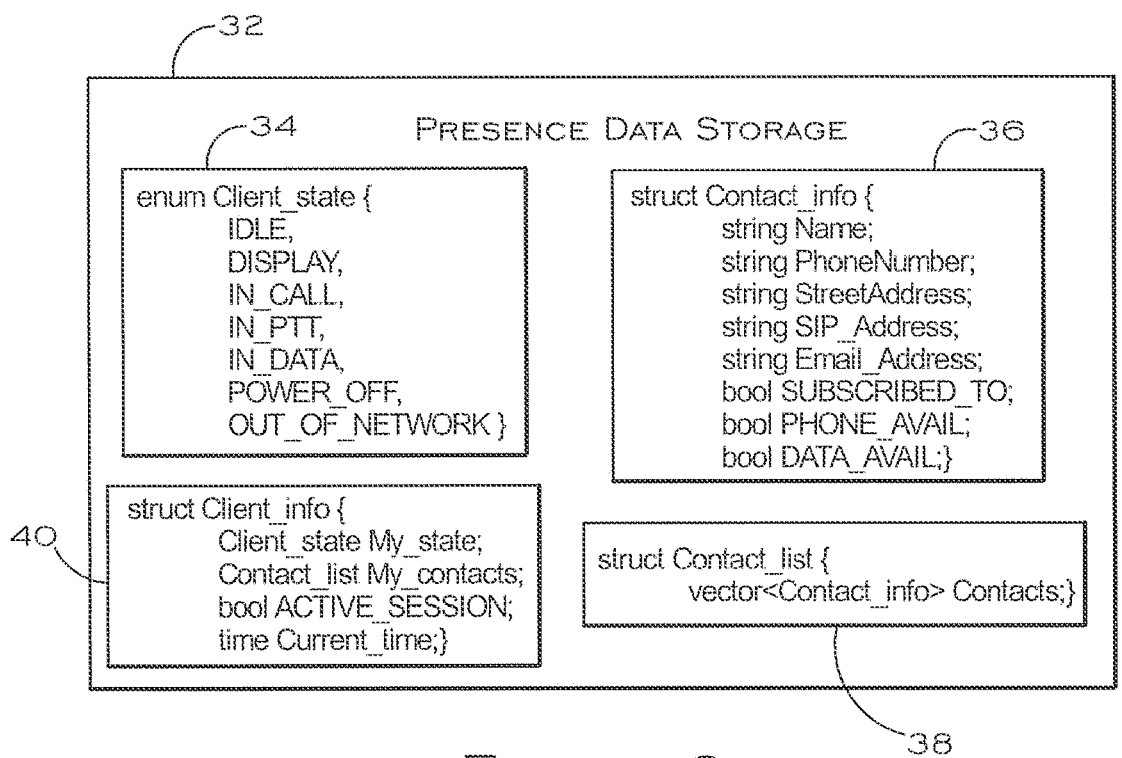
FIG. 3 illustrates pseudo-code for the storage of presence data at a client device.

In this exemplary embodiment, a presence client software application stores presence data 32, illustrated in FIG. 3. Among the presence data 32 is data relating to the state of the client device. Such state information 34 is stored using, for example, a variable type referred to as Client state, which can take on values IDLE, DISPLAY, IN_CALL, IN_PTT, IN_DATA, POWER_OFF, or OUT_OF_NETWORK.

In this embodiment, the presence client is provided with contact list data. Information concerning each contact in the contact list data can be stored as a data structure 36, called Contact_info in the present example. Each Contact_info data structure can include information on a contact's name, telephone number, street address, SIP address, and email address. The Contact_info data structure may further include flags or other indicators as to whether the presentity client is subscribed to receive presence information as to that contact. In some embodiments, the presentity client is responsible for tracking its own subscriptions, and this flag can be the only information identifying those contacts for which the client has a subscription. In other embodiments, subscription information may be stored elsewhere at the client device, or at a presence server, and this flag may echo or may be synchronized with the information stored elsewhere. In this illustration, the presence information as to each contact is also stored as flag information in the Contact_info data structure, though other embodiments may store such data elsewhere. This exemplary data structure contains flags indicating whether the contact is available for phone communications and whether it is available for data communications. The choice of presence information stored for each contact may be the same for each contact (as in the illustration), or it may depend on such factors as the capabilities of the mobile device on which the presence client is implemented, or the capabilities of the device or devices indicated by the contact information.

For convenient manipulation of contact information, the contacts may themselves be organized in a data structure 38 referred to in this example as Contact_list. This data structure is implemented as a vector of Contact_info structures in the illustration, but different embodiments can implement a contact list data structure in different ways, such as in an array or in a single- or double-ended queue.

The information most relevant to the operation of a client as both presentity and watcher can be collected in a data structure 40 identified in the example as Client_info. This data structure can store the current presence state of the presentity client in a variable My_state, which is a variable of type Client_state. The Client_info structure can further store a contact list My_Contacts (or, alternatively, a pointer to a contact list). The Client_info structure also stores a flag ACTIVE_SESSION that indicates whether the presentity client is in an active session with a presence server. In some embodiments, the Client_info structure can keep track of the current time, a feature that can be useful in determining when the client enters and exits the display state.

The client device is capable of sending messages to the client server. This can be accomplished through calls to a function or routine SendMessage, which takes as its arguments the message to be sent and the address of the recipient. In embodiments in which the client is implemented on a device having a network interface, such as a mobile station with wireless telecommunications circuitry, the SendMessage function causes the message to be sent over the network interface.

Figure 4:
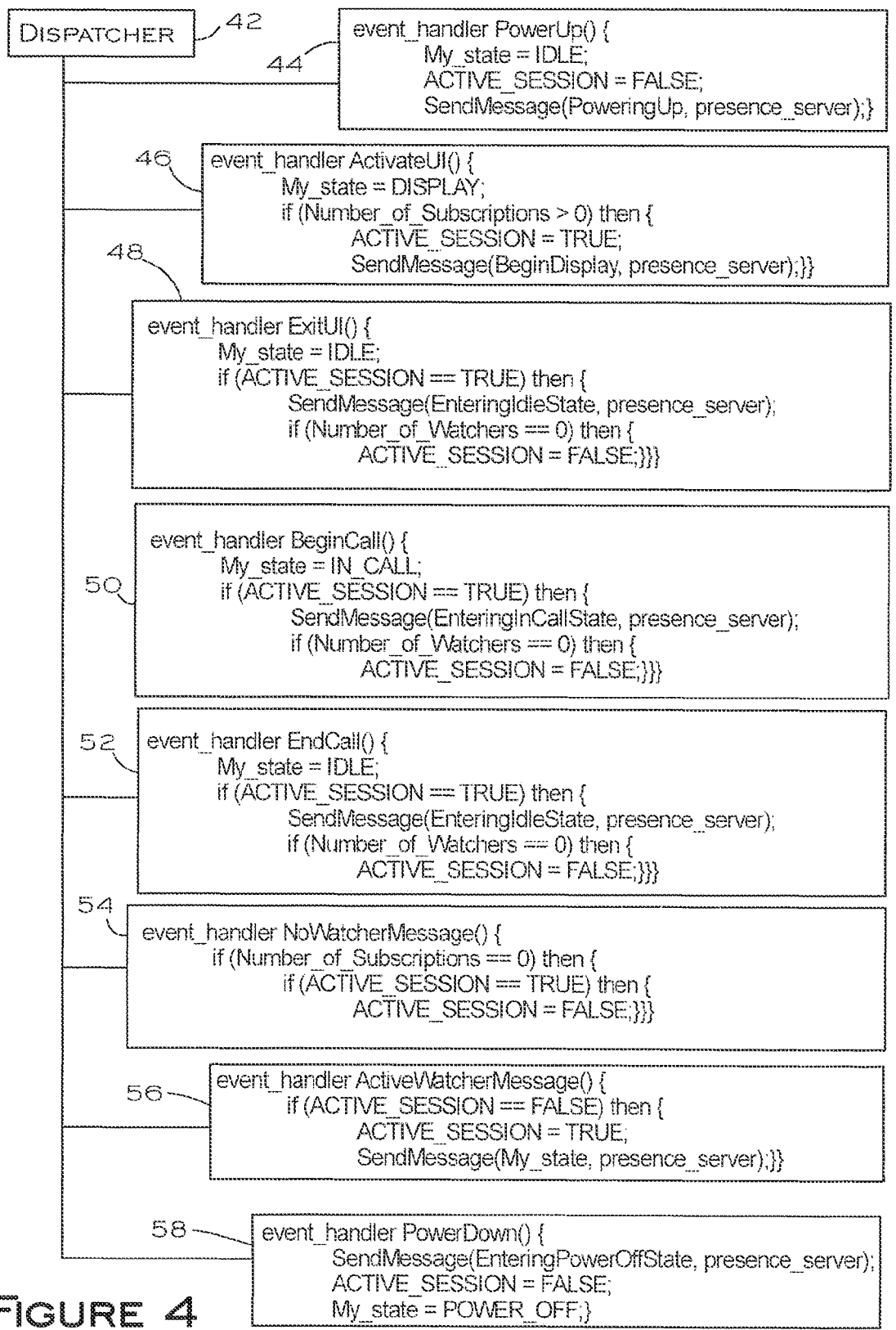
FIG. 4 illustrates pseudo-code for the operation of a presence client.

In this exemplary embodiment, the presence client is provided with handlers that respond to activities at the client device and to messages received from the presence server. As illustrated in FIG. 4, a dispatcher 42 selects which handler to call in response to a message or other event. In a situation in which the client receive presence updates that include more than one message, the dispatcher 42 parses the updates into individual messages for processing. When the client device is first turned on, this exemplary presence client calls an event handler PowerUp 44. This handler initializes the client's state to IDLE and initializes the flag ACTIVE_SESSION to FALSE, indicating there is not currently an active session with a presence server. The handler further causes the client device to send a message to a presence server reporting that it has transitioned into a power-on state.

In this exemplary embodiment, entry into the display state is triggered by activation of a user interface on the client device. When the user interface is activated, this dispatcher calls an event handler ActivateUI 46. This handler switches the client's state to DISPLAY. If the client has subscriptions to receive presence information from any other presentities, then the handler sets the flag ACTIVE_SESSION to TRUE, and it reports its change to the display state to the presence server. (An exemplary server response to such a report is illustrated by handler 72 of FIG. 5.)

In this exemplary embodiment, one way in which a client transitions out of the display state is by exiting the user interface. Exiting the user interface results in the calling of an event handler ExitUI 48. This handler switches the client's state to IDLE. The client reports that state change to the presence server, though, only if the client is in an active session with the presence server. In this embodiment, the client is in an active session with the presence server only if it has any watchers, or if it is a watcher itself and is in the display state. The number of watchers of a presentity can be tracked by a variable Number_of_Watchers. Preferably, this number refers to the number of watchers of a presentity who are themselves in a display state. However, it is to be understood that the systems described herein can be implemented in combination with always-on watchers (such as some prior-art watchers), for which the display state is undefined, or which do not report such a state to a presence server. Such watchers may be treated as if they are always in the display state, or they may be handled in other ways. For example, to prevent always-on watchers from draining the resources of mobile presentities, they can be treated as being in the display state intermittently or periodically.

Thus, when the presence client in this example is in an active session and it exits the display state, it tests whether it should remain in an active session by determining whether it has any watchers. If it does not, then it exits the active session.

When the device on which the presentity client is implemented engages in a voice call, the dispatcher 42 of the presentity client calls handler BeginCall 50. This handler sets the client's state to IN_CALL. If the client is in an active session, that state transition is reported to the presence server. In this embodiment (but not necessarily in all embodiments), entering an IN_CALL state also causes exiting of the display state. Thus as with the ExitUI handler, the BeginCall handler determines whether the presence of any watchers necessitates remaining in an active session.

When the voice call ends, the presentity client calls handler EndCall 52. This handler sets the client's state back to IDLE. In embodiments, such as this one, when the idle state is disjoint with the display state, the handler determines whether the presence of any watchers necessitates remaining in an active session.

The presence client responds to messages from the presence server that provide information on the presence or absence of active watchers. The presence client may be informed of the number of active watchers, or of each addition or subtraction of an active watcher, or it may simply be informed of whether or not it has any active watchers. In this exemplary embodiment, the presence server is capable of sending to the client a NoWatcherMessage and an ActiveWatcherMessage, which indicate whether or not the client has any active watchers. Whether the client itself watching any presentities is tested in this example by looking at the variable Number_of_Subscriptions, though other embodiments may provide for acting as a watcher without having a subscription. In response to receiving a NoWatcherMessage, the client calls eponymous handler 54. If the client has no subscriptions, then the client exits the active session.

Receipt by the client of an ActiveWatcherMessage causes eponymous handler 56 to be called. Regardless of whether the client is watching any presentities, the receipt of an ActiveWatcherMessage in this example results in the client entering an active session and reporting its current state to the server.

A presence client preferably reports a transition to a power-off condition regardless of whether it is in an active session. In this way, presence servers can avoid sending messages to powered-off devices, helping to limit demands on communication bandwidth. As part of a power-down routine, the dispatcher calls handler PowerDown 58. This handler reports the state change to the server, sets the ACTIVE_SESSION flag to FALSE and sets the client state to POWER_OFF.

In this illustrative embodiment, the presence client does not specifically report to the presence server whether or not it considers itself to be in an active presence session. Rather, the presence server is responsible for inferring whether the client is in an active session based on the state-change reports it does receive. For example, when the state changes from DISPLAY to IDLE, or to another non-display state, the presence server may itself determine whether the presence client has any active watchers, and, if not, it considers the active session to have ended. This type of embodiment avoids the need for acknowledgement messages or handshake protocols for setting up or ending an active presence session. However, other embodiments may ensure greater synchronization by using such additional messages.

2. Presence Information Used by a Presence Server

In this exemplary embodiment, a presentity server software application stores presence information 60 (FIG. 5*a*) relating to the presence states of various clients with which it communicates. Such information is stored using, for example, a variable type referred to as Presence_state 62. In some embodiments, the variable type Presence_state accepts the same range of values as those of the variable type Client_state stored at each client. To illustrate that this is not necessarily the case, though, the present example reflects a surjective mapping of Client_state onto Presence state. In this example, a variable of type Presence_state can take on the values AVAILABLE and UNAVAILABLE. As a result, the client's IN_CALL, IN_PTT, IN_DATA, POWER_OFF, and OUT_OF_NETWORK states are all grouped together at the server as UNAVAILABLE, and the client's IDLE and DISPLAY states are considered AVAILABLE. This limiting of the number of different presence states tracked by a presence server, though optional, can also help control the number of messages sent to watchers (and thereby conserve the power and communication resources of the watchers) by focusing on the more relevant state changes. In embodiments with fewer power and bandwidth limitations, the number of presence states can be conserved.

The presence server in this embodiment maintains a data structure 64 for each of its presence clients. Such information can include, for example, the address of the presentity, the Presence_state of the presentity, and information on whether the client is in an active session. The server in this embodiment further collects information identifying the active watchers of the particular client, and information identifying the other presentities for which the client is subscribed to receive presence information. The Presentity_info about a particular presentity is, in this embodiment, referenced with the variable Presentity_ID 66.

The presence server further stores information used to determine whether, and to what extent, minimum-delay throttling will be imposed on presence updates sent to each watcher. In the present example, this information is stored in the Presentity_info data structure, though it may be stored elsewhere in other embodiments. The time at which the presentity began a presence session is stored in the variable Start_of_Session. The time at which the last presence update was received from that presentity is stored in the variable Last_Update_Received. The time at which the last presence update was sent to that presentity is stored in the variable Last_Update Sent. The variable Paging_Zone_ID is used to identify a paging zone in which the presentity is believed to be located. A variable and/or function Throttle_Level is provided to identify the level to which presence updates to that presentity are throttled, by minimum-delay throttling or otherwise.

In an alternative embodiment, the variable Last_Update_Received stores the time at which the last non-automatic presence update was received from the presentity. A non-automatic presence update is one that is not sent automatically as a consequence of other uses of a mobile station. For example, a presence attribute may indicate the "mood" of a person using the mobile station, or whether the person (as opposed to a telephone line) is "busy"; changes to such attributes should be considered non-automatic.

The variable "Paging_Zone_ID" is used in this example to identify one means of determining where in the network the mobile device is located and thus, what portion of the network is relevant for determining the level of network load. The use of paging zones is convenient when network load is measured by reference to the load on a paging channel. However, other information, such as information identifying a particular cell or sector, can be used to associate a presentity with portions of a network whose load is under consideration. Where the load on an entire network is measured as a whole, such information may be excluded altogether. It should moreover be noted that this information, like other presentity information described herein, need not be stored locally by the presence server; rather, information on the location of a mobile station can be retrieved on an as-needed basis from, for example, a home location register (HLR) on a mobile telecommunications network.

Figure 5A:
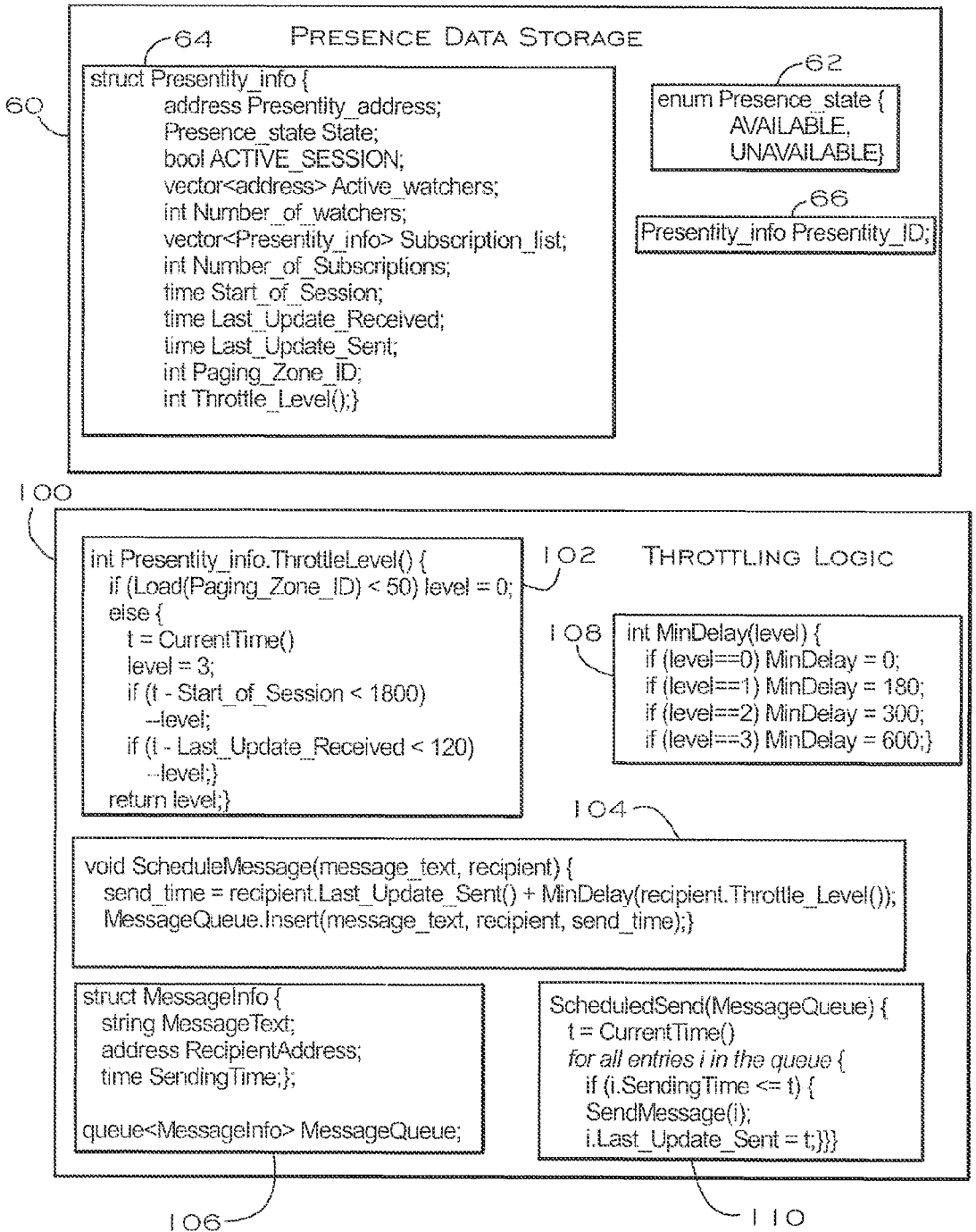
FIGS. 5a and 5b illustrate pseudo-code for the operation of a presence server.
Figure 5B:
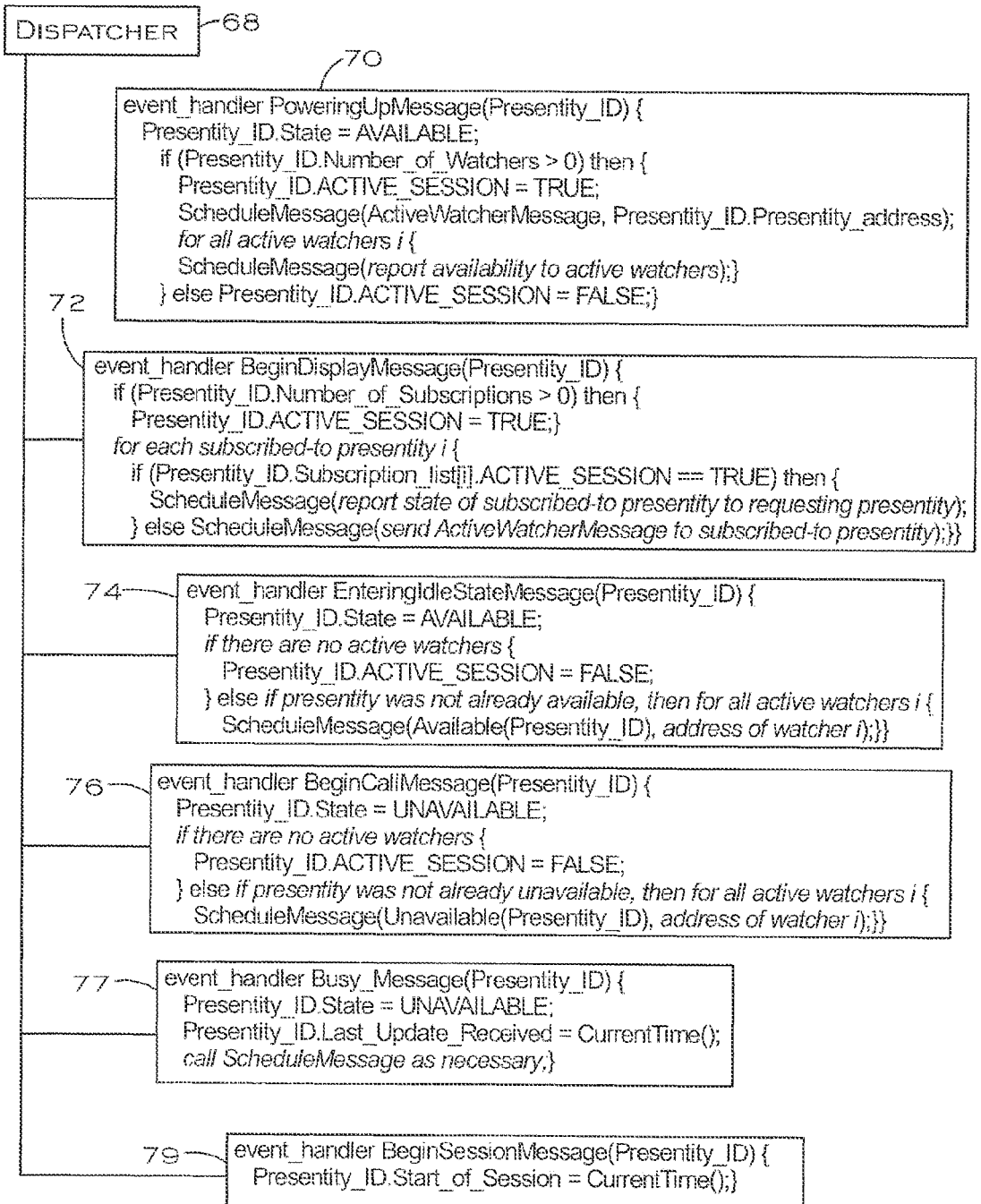

Like the presence client software, the presence server software in this example is (as shown in FIG. 5b) embodied using a dispatcher 68 and event handlers that respond to messages from presence clients and, in response, causes update messages to be sent to presentities and watchers as appropriate. When conditions of high network load exist, however, it is desirable that such updates be sent at a lower frequency, not in real time. To send messages at appropriate intervals, the presence server is equipped with throttling logic 100, illustrated in FIG. 5a.

As an overview, the dispatcher and handlers of FIG. 5b generate presence update messages to be sent to presence clients, while the throttling logic 100 of FIG. 5a determines when these update messages will actually be sent to the presence clients. In the paradigm illustrated by FIGS. 5a and 5b, messages are generated in advance and may be delivered only later. In other embodiments, the presence update messages may not be generated at all until it is time for the messages to be sent.

3. Determining the Level of Throttling

The throttling logic 100 provides logic 102 for determining the level of throttling. This logic is implemented as a software function ThrottleLevel( ) which may be an interface to the Presentity_info data structure. This function determines the level of network load by calling the function Load( ) with the parameter Paging_Zone_ID. In this example, the function Load( ) returns, the paging channel load of the identified paging zone, as a percentage of the paging channel capacity. The Load( ) function can be implemented using any one of a variety of techniques for measuring network load. For example, the Load( ) function can cause the presence server to communicate with a controller that has access to network load information. The presence server can periodically poll the controller for an update on network load, or the controller can periodically push an update on network load to the presence server. The network load information may be a measure of network load of the radio access network or the network load of the entire access network, which may include, but is not limited to, a radio access network and the Internet.

The ThrottleLevel( ) function compares the network load with a threshold. In the example of FIG. 5a, the threshold is 50% of capacity, but other threshold levels may be selected, and, in particular, the threshold may be refined by monitoring the effect on quality of service of changes to the threshold in practice. If the paging channel load is below the threshold, the throttle level is set to zero, corresponding to no throttling (so that presence updates are sent substantially in real time). If the paging channel load does reach the threshold, then various techniques can be used to determine what level of throttling is imposed. One possible technique is implemented in the exemplary throttling level determination logic 102. In this example, the throttling level is set by default at its highest level (level 3, in this example), but the level of throttling is reduced if certain conditions apply. For example, if fewer than 1800 seconds (30 minutes) have passed since the presentity began its presence session, the level of throttling can be decremented by one. Similarly, if the presentity last sent its own presence update (or, in particular, a non-automatic presence update) within the last 120 seconds (two minutes), the level of throttling is decremented by one. Thus, if both of these conditions are met, the level of throttling returned by the function is 1, if only one of them is met, the level of throttling is 2, and if neither of them is met, the level of throttling is 3.

Other techniques for determining a level of throttling may be used. The presence server may first categorize each mobile station based on the length of time since the start of a presence session (factor 1). For instance, the presence server may consider the mobile station to be high priority for factor 1 ($High_1$) if the mobile station's presence session began less than a threshold time ago, such as less than 10 minutes ago. On the other hand, the presence server may consider the mobile station to be low priority for factor 1 ($Low_1$) if the mobile station's presence session began longer than the threshold time ago. In other embodiments, more than two priority levels could be used.

Further, the presence server may categorize the mobile station based on the time since the last presence update (factor 2). For instance, the presence server may consider the mobile station to be high priority for factor 2 ($High_2$) if the mobile station last sent a presence update message to the presence server less than a threshold time ago, such as less than 2 minutes ago. On the other hand, the presence server may consider the mobile station to be low priority for factor 2 ($Low_2$) if the device last sent a presence update message to the presence server more than a threshold time ago. In other embodiments, more than two priority levels for this factor could be used as well.

The presence server may then combine its findings for the two factors, to establish a composite priority level for the device. For instance, the presence server could have three priority levels as follows:

$High_1 High_2$=Highest priority $High_1 Low_2$ or $Low_1 High_2$=Medium priority $Low_1 Low_2$=Lowest priority Increasing levels of priority can then be mapped onto decreasing levels of throttling.

Alternatively, the presence server could have four priority levels as follows (with the ordering of the second and third priority levels being determined based on historical data or user experience research):

$High_1High_2$=Priority A $High_1Low_2$=Priority B $Low_1High_2$=Priority C $Low_1Low_2$=Priority D Other prioritizations could be applied as well, particularly depending on how many categorizations are applied for each of the factors.

4. Implementing Minimum-Delay Throttling

The exemplary throttling logic 100 implements throttling with the use of minimum-delay throttling, although other throttling techniques could be used in alternative embodiments. Message scheduling logic 104 is provided to determine when messages will be sent to the presentities for which they are intended. In the example of FIG. 5a, the message scheduling logic is implemented by a software function ScheduleMessage( ) which inserts messages into an outgoing message queue 106. The message queue 106 stores each message itself (MessageText), the address to which the message will be sent (RecipientAddress), and the time at which the message should be sent (SendingTime).

When the ScheduleMessage( ) function of the scheduling logic 104 is called, the scheduling logic determines the level of throttling imposed on the message's intended recipient through the Throttle_Level( ) interface of the throttling level determination logic 102. The scheduling logic 104 then determines the length of the minimum delay that corresponds to the appropriate level of throttling. The scheduling logic 104 makes this determination by calling the function MinDelay( ) of delay mapping logic 108.

In the example of FIG. 5a, the delay mapping logic receives as a parameter only the level of throttling, and it returns the corresponding minimum delay in seconds. In this simple example, the delay mapping logic 108 could be replaced by a simple array of integers, in which case MinDelay(Level) would be replaced by MinDelay[Level]. For instance, the presence server may be preset to apply a minimum delay period of 180 seconds (3 minutes) for a Highest priority user, a minimum delay period of 300 seconds (5 minutes) for a Medium priority user, and a minimum delay period of 600 seconds (10 minutes) for a Lowest priority user.

However, it should be understood that the delay mapping logic may take additional information into consideration. For example, the length of the minimum delay for a particular throttling level could vary depending on a measure of network load, such as the paging channel load. In the optional embodiment where the presence server also takes into consideration the paging channel load in setting the minimum delay period, the presence server may maintain a reference table, for example a two-dimensional array of integers, that indicates minimum delay periods for each of the priority levels depending on the current paging channel load or other measure of downlink load.

The presentity information 64 may store a value indicating the level of throttling applied to a presentity. As an alternative, or in addition, it may store a value that directly indicates the length of the minimum delay.

Once it has determined the length of the minimum delay, the scheduling logic 104 adds that delay to the time at which the last update was sent to the presentity. The sum is the time at which the message is scheduled to be sent to the presentity. For example, if the last update was sent to the presentity at 13:05:24 and the minimum delay is 180 seconds, the next message is scheduled to be sent at 13:08:24. The message, together with its scheduled send time and recipient identifier, are then inserted into the message queue.

The throttling logic 100 is provided with sender logic 110, implemented in this example by the software function ScheduledSend( ). The ScheduledSend( ) function is called frequently to determine whether it is time to send any of the messages in the queue. If so, those messages are sent, and a record is made (by setting the Last_Update$_1$ Sent variables) of when the messages were sent. The sender logic 110 preferably also operates to group messages scheduled to be sent to a single recipient, so that the recipient can receive multiple presence updates in a single transaction. These presence updates are sent by the server over a network interface, such as a local area network card, radio link interface, modem, or other network interface.

5. Message Handling by a Presence Server

As shown in FIG. 5b, the presence server software in this example, like the presence client software, is embodied using a dispatcher 68 and event handlers that respond to messages from presence clients.

For example, the presence server may receive a message from the client identified by Presentity_ID, indicating that the client device is powering up. In response to this message, the presence server calls the event handler PoweringUpMessage 70. This handler sets the state of the presentity to AVAILABLE. The presence server then tests whether the client has any active watchers. If so, it schedules the ActiveWatcherMessage to be sent to the client, triggering the client to enter an active session (as in handler 56 of FIG. 4), and it schedules an "Available" message to be sent to each active watcher, indicating that the client is available for communications. If the client has no active watchers, the client is not yet considered to be in an active session.

If the presence server receives a message indicating that the presence client has entered the display state, it calls handler BeginDisplayMessage 72. If the client is subscribed to receive presence updates as to other presentities, then the server notes that an active session should be initiated for the client, and it retrieves for the client the requested presence information. It retrieves this presence information in different ways depending on whether the subscribed-to presentities are themselves in active sessions. For those subscribed-to presentities that are in active sessions, the presence server already has up-to-date presence information on those presentities, and it schedules the appropriate messages to be sent sends to the client to report on that information. For subscribed-to presentities that are not in active sessions, the presence server schedules messages informing them that they now have a watcher, thereby prompting them to enter an active session, to report their current state to the presence server (as in handler 56 of FIG. 4), and to report any state changes taking place while they are in the active session (as in, e.g., handler 50 of FIG. 4). In the illustration, the client receives one message for each presentity; this information may in some embodiments be compiled into a smaller number of messages for delivery to the client.

If the presence server receives a message indicating that the presence client has entered the idle state, it calls handler EnteringIdleStateMessage 74. This handler sets the presence state of that client to AVAILABLE. If the client has watchers with active sessions, the handler schedules messages to inform those watchers of the state change. If the client does not have watchers with active sessions, then the client itself is marked as not being in an active session (since, in this embodiment, entering the IDLE state involves leaving the DISPLAY state).

If the presence server receives a message indicating that the presence client is engaged in a voice call, it calls handler BeginCallMessage 76. This handler sets the presence state of that client to UNAVAILABLE. If the client has watchers with active sessions, messages are scheduled to inform those watchers of the state change. If the client does not have watchers with active sessions, then the client itself, is marked as not being in an active session. (In other embodiments, in which the in-call state is not disjoint with the display state, being in-call does not necessarily end an active session with the client from an active session.)

If the presence server receives a message indicating that the user of the presence client is "busy," the dispatcher 68 calls handler Busy_Message 77. Because an indication that the user is busy is not an automatic presence update, the dispatcher updates the variable Last_Update_Received to the present time. Similar actions can be taken to record the time of receipt when the user indicates that he or she is "not busy," or when a "mood" or other non-automatic presence message is received.

When a user first begins a presence session, the user's mobile station may send a "BeginSessionMessage" to the presence server. Aside from other actions the server may take to initiate the presence session, the handler 79 records the start time of the session in the variable Start_of_Session.

Intermittently, periodically, or specifically in response to a presentity leaving the display state, the presence server determines whether any other presentities should be sent a "NoWatcherMessage" to inform them that they no longer have an active watcher.

The exemplary presence server processes further messages from along the lines described above. In general, state changes reported by a presence client are processed by scheduling reports of those changes to be sent to watchers with active sessions. Some such state changes are further processed by determining whether the state change affects that client's active session status. Some state changes are further processed by determining whether the state change affects the active session status of other presence clients.

F. Other State-Change Processing Functions

In part to simplify the exposition of the systems enabled by the present disclosure, the foregoing description has presented a simplified description of some of the message-handling functionality of a presence client and presence server. As one example of a different embodiment, additional presence states may be defined. Different presence clients may even employ different presence state definitions. In such a case, the presence server can play a role of translator, mapping presence states reported by one client onto presence states that can be understood by another presence client.

The embodiments described in Section E referred to observing the states of subscribing watchers. It should be recognized, though, that a presence client can be an active watcher without necessarily having a subscription. As just one example, a presence client may be embodied on a device that is especially concerned, for bandwidth or power reasons, with minimizing the amount of messaging. When a user of the device opens the user interface of a contact list application, the device enters the display state. If the client has no active watchers, it need not report this transition to the presence server. The user of the device may then activate, for example, a "check availability" command button accompanying a contact list entry. In response, the presence client reports (if it has not yet done so) that it is entering an active session, and it requests that contact's presence information. If that contact is itself in an active session, the presence server is already in possession of up-to-date presence information and can report that information without additional communications to the contact. Otherwise, the presence server can prompt the contact to enter an active session by sending, for example, an ActiveWatcherMessage to that contact.

In the embodiments described in Section E, the concept of an active presence session is a symmetric one, so that a presence client is eligible to receive real-time presence updates if and only if it is also sending real-time presence updates. In other embodiments, a presence client may have two (or more) types of active presence sessions—such as an "active watching session" and an "active reporting session"—either, both, or neither of which the client may be in at any one time. In such an embodiment, for example, the client may be in an "active watching session" only when it is watching other presentities and is in the display state, and it may be in an "active reporting session" only when it is being watched by another presentity that itself is in the display state. A client can be confident it is receiving reasonably up-to-date presence updates from a server only when the client is in such an active watching session, and a presence server can be confident it is receiving reasonably up-to-date presence updates from a client only when the client is in such an active reporting session. In such an embodiment, a presentity is preferably in an active reporting session if and only if at least one other client is in an active watching session as to that presentity; and a watcher is preferably in an active watching session if and only if that watcher has requested presence information as to at least one other client, and that watcher is in a display state.

In embodiments in which the display state is not defined or not reported by incompatible or legacy presence clients, other presence states or information can be interpreted as proxies for the display state. For example, a legacy presence client may report when the device on which it resides is powered on. The presence server may treat this report as initiating the display state, and the presence server may treat the legacy client as being in the display state for a predefined period, e.g. three minutes, after the presence client is powered on. A report that the client has become unavailable may terminate the display state before the expiration of that period.

G. Handling Unreachable Clients

In a preferred embodiment, when a presence client cannot be reached, the presence server is capable of distinguishing between a client that has powered down and a client that is out of network. Preferably, clients report to the presence server when they are powering down, so that the presence server can treat them as being in a powered-off state until the client reports otherwise. Because a client may find itself out of network before it is able to report that condition to the server, though, the server itself preferably implements a procedure to determine whether the client is out of network. For example, if the server has not, after a reasonable number of attempts, received any response from a client, and that client is not known to be in a powered-off state, the server may set the client's state as being out-of-network. When a client is in an out-of-network state, the server may intermittently or periodically attempt to send test messages to the client to determine whether the client is back in the network. Preferably, the server keeps a record of the last known place and time of contact with the client.

III. Hardware

In preferred embodiments, the operation of the presence client is embodied in the execution of software on the processor of a wireless mobile station, and the operation of the presence server is embodied in the execution of software on one or more networked server computers. Such server computers may be capable of direct wireless communications with presence clients, e.g. through wireless local area networks or, in more proximate situations, through personal area networks such as Bluetooth. In preferred embodiments, though, it is expected that presence clients will establish wireless communications through the base transceiver stations of a wireless telecommunications service provider, and that the presence clients and presence servers will communicate through the telecommunications service provider. Each presence server may be operated by that service provider or by other entities. In some embodiments, the presence client may be implemented on a portable data storage medium, such as a SIM or flash memory device, allowing a user to port his presence information among different hardware devices.

The functions described herein as being implemented by a presence server may be performed by a system of networked presence servers. Although this can be implemented in several ways, one way is for each presence client to be assigned a particular presence server with which it will communicate. This assignment may be made based on geographic or load-balancing considerations, and/or a client may be assigned to a presence server affiliated with a service provider of which the user of the client device is a customer. Presence information can be shared between clients of different servers in various ways. In one such way, the presence server assigned to a watched presentity can keep track of the addresses of all watchers and can send presence updates to each of those watchers. In another such way, the presence server assigned to a watched presentity can keep track of the address of other presence servers. Presence updates can be sent to all other presence servers, or only to presence servers having active watchers. The presence servers receiving those updates are then responsible for forwarding the updates as necessary to the active watchers with which they are associated.

The examples and variations described above represent particular embodiments of the invention; they do not define the limits of the invention. Such limits are provided only by the following claims.

What is claimed is:

1. A method of providing a presence service, comprising:
   determining a paging channel load in a zone of a wireless telecommunications network;
   sending a plurality of outgoing presence updates to a mobile station located in the zone, wherein the outgoing presence updates are sent over the wireless telecommunications network on a channel different from the paging channel;
   throttling the outgoing presence updates while the paging channel load exceeds a threshold load, wherein the throttling is minimum-delay throttling, and wherein throttling the outgoing presence updates comprises scheduling presence updates so that a minimum delay passes between presence updates to the mobile station, wherein the minimum delay is based at least in part on the paging channel load;
   selecting one of a plurality of levels of throttling for the mobile station, wherein the throttling of the outgoing presence updates is performed at the selected level; and
   determining an amount of time that has elapsed since the mobile station began a presence session, wherein the level of throttling is determined at least in part by the amount of time that has elapsed since the mobile station began the presence session.

2. The method of claim 1, wherein the minimum delay is determined at least in part by the amount of time that has elapsed since the mobile station began the presence session.

3. The method of claim 2, further comprising increasing the minimum delay as the amount of time that has elapsed since the mobile station began the presence session increases.

4. The method of claim 2, further comprising determining an amount of time that has elapsed since an incoming presence update was received from the mobile station, wherein the minimum delay is determined at least in part by the amount of time that has elapsed since an incoming presence update was received from the mobile station.

5. The method of claim 1, further comprising determining an amount of time that has elapsed since an incoming presence update was received from the mobile station, wherein the minimum delay is determined at least in part by the amount of time that has elapsed since an incoming presence update was received from the mobile station.

6. The method of claim 5, further comprising decreasing the minimum delay as the amount of time that has elapsed since the incoming presence update was received from the mobile station decreases.

7. The method of claim 5, wherein the amount of time that has elapsed since an incoming presence update was received from the mobile station is measured from a time at which a non-automatic presence update was received from the mobile station.

8. The method of claim 1, wherein the throttling is minimum-delay throttling that includes scheduling presence updates so that the minimum delay passes between consecutive presence updates to the mobile station.

9. The method of claim 1, further comprising:
   determining whether the mobile station is in an active presence session, wherein the mobile station is in the active presence session if the mobile station has requested presence information of at least one other mobile station or at least one other mobile station has requested presence information of the mobile station; and
   determining the minimum delay based at least in part by whether the mobile station is in the active presence session.

10. The method of claim 1, wherein throttling the outgoing presence updates while the paging channel load exceeds the threshold load comprises throttling the outgoing presence updates while the paging channel exceeds 50% of capacity, and
   wherein when the paging channel load is below 50% of capacity, the minimum delay is approximately set to zero.

11. The method of claim 1, further comprising:
   throttling the outgoing presence updates while the paging channel load exceeds the threshold load using the minimum delay at a first level;
   decreasing the minimum delay by one level lower than the first level when an amount of time that has elapsed since the mobile station began a presence session is below a first threshold amount;
   decreasing the minimum delay by one level lower than the first level when an amount of time that has elapsed since an incoming presence update was received from the mobile station is below a second threshold amount; and
   wherein when the amount of time that has elapsed since the mobile station began the presence session is below the first threshold amount and the amount of time that has elapsed since the incoming presence update was received from the mobile station is below the second threshold amount, decreasing the minimum delay by two levels lower than the first level.

12. The method of claim 1, further comprising
determining a first priority factor of the mobile station based on an amount of time that has elapsed since the mobile station began a presence session;
determining a second priority factor of the mobile station based on an amount of time that has elapsed since an incoming presence update was received from the mobile station;
combining the first priority factor and the second priority factor to establish a composite priority level for the mobile station; and
determining the minimum delay based on the composite priority level.

13. The method of claim 12, further comprising decreasing the minimum delay based on an increasing composite priority level.

14. A non-transitory computer readable medium having stored therein instructions executable by a computing device to cause the computing device to perform functions comprising:
determining a paging channel load in a zone of a wireless telecommunications network;
sending a plurality of outgoing presence updates to a mobile station located in the zone, wherein the outgoing presence updates are sent over the wireless telecommunications network on a channel different from the paging channel;
throttling the outgoing presence updates while the paging channel load exceeds a threshold load, wherein the throttling is minimum-delay throttling, and wherein throttling the outgoing presence updates comprises scheduling presence updates so that a minimum delay passes between presence updates to the mobile station, wherein the minimum delay is based at least in part on the paging channel load;
selecting one of a plurality of levels of throttling for the mobile station, wherein the throttling of the outgoing presence updates is performed at the selected level; and
determining an amount of time that has elapsed since the mobile station began a presence session, wherein the level of throttling is determined at least in part by the amount of time that has elapsed since the mobile station began the presence session.

15. The non-transitory computer readable medium of claim 14, further comprising instructions executable by the computing device to cause the computing device to perform functions comprising:
increasing the minimum delay as the amount of time that has elapsed since the mobile station began the presence session increases;
determining an amount of time that has elapsed since an incoming presence update was received from the mobile station; and
decreasing the minimum delay as the amount of time that has elapsed since the incoming presence update was received from the mobile station decreases.

16. A presence system comprising:
a presence server operative to generate presence update messages for a mobile station;
network load determination logic operative to determine a level of network load associated with the mobile station, wherein the network load determination logic is configured to determine the level of network load based on a determination of a load of a paging channel serving the mobile station;
throttling level determination logic operative to determine a level of throttling of presence updates based at least in part on an elapsed amount of time, wherein the elapsed amount of time is selected from the group consisting of a) time that has elapsed since the mobile station began a presence session, and b) time that has elapsed since an incoming presence update was received from the mobile station; and
scheduling logic operative, in response to a determined level of throttling, to select one of a plurality of levels of throttling for the mobile station so as to schedule presence updates for delivery at the selected level so that a minimum delay passes between presence updates to the mobile station, wherein the throttling is minimum-delay throttling and the scheduling logic is operative to schedule at least the minimum delay between presence updates to the mobile station, wherein the minimum delay is based at least in part on the level of network load and on the determined level of throttling, and
a network interface operative to send presence updates to the mobile station in accordance with the schedule.

17. The system of claim 16, wherein the scheduling logic is operative to apply the determined level of throttling to schedule presence updates for delivery when the mobile station is in a region including a paging channel load exceeding a threshold load.

* * * * *

UNITED STATES PATENT AND TRADEMARK OFFICE
CERTIFICATE OF CORRECTION

PATENT NO. : 8,290,519 B2
APPLICATION NO. : 13/240486
DATED : October 16, 2012
INVENTOR(S) : Yaojun Sun et al.

Page 1 of 1

It is certified that error appears in the above-identified patent and that said Letters Patent is hereby corrected as shown below:

On the title page, at Item [73], please delete Assignee "Spring Spectrum L.P." and add Assignee -- Sprint Spectrum L.P. --.

Signed and Sealed this
Twenty-first Day of May, 2013

Teresa Stanek Rea
*Acting Director of the United States Patent and Trademark Office*